F. J. WOLFF.
FAUCET.
APPLICATION FILED JAN. 29, 1912.
1,082,988.
Patented Dec. 30, 1913.
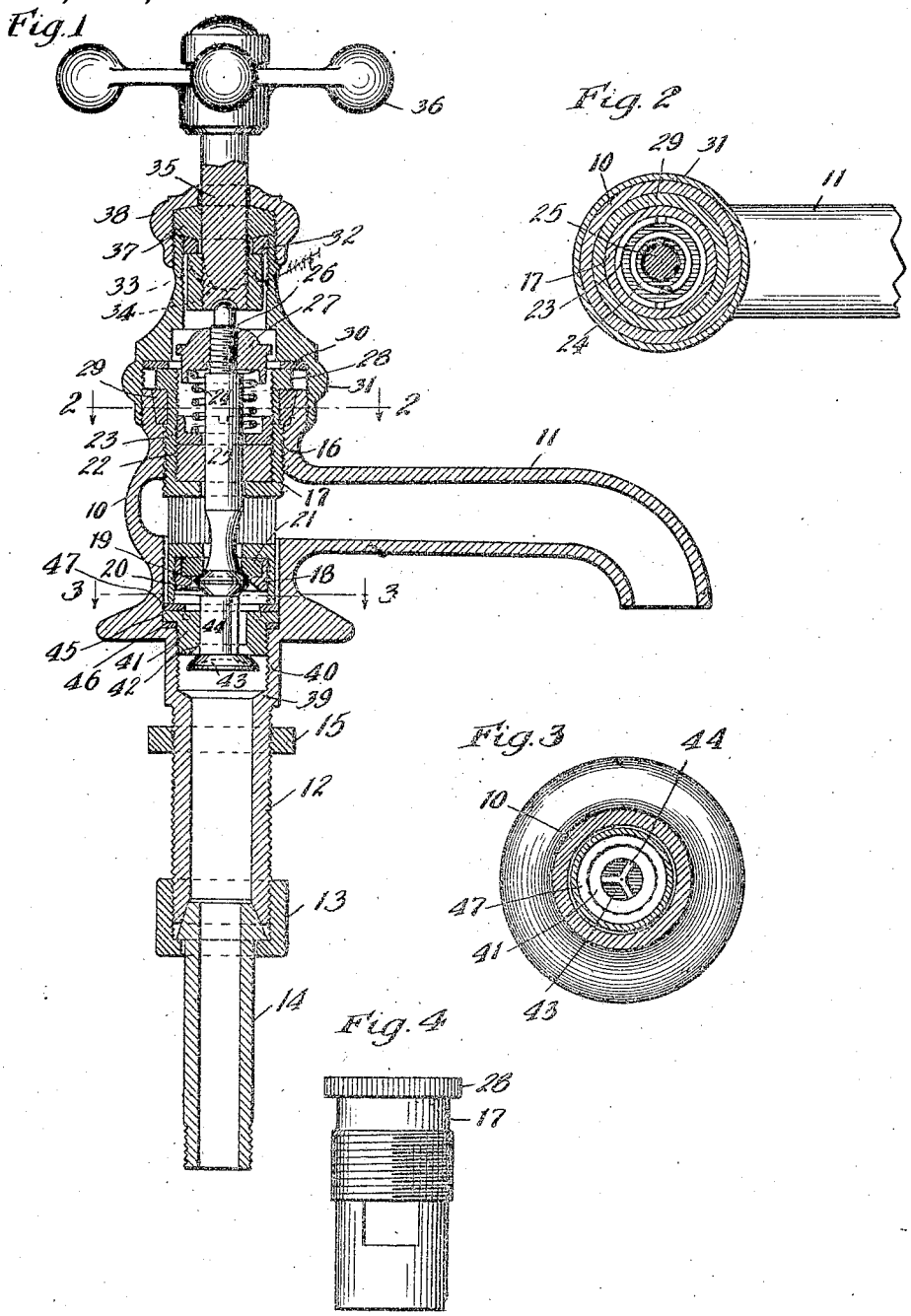
Witnesses
Wm. Geiger
H. W. Munday
Inventor:
Franklyn J. Wolff
By Munday, Evarts, Adcock & Clarke
Attys

UNITED STATES PATENT OFFICE.

FRANKLYN J. WOLFF, OF MINNEAPOLIS, MINNESOTA, ASSIGNOR TO L. WOLFF MANUFACTURING COMPANY, OF CHICAGO, ILLINOIS, A CORPORATION OF ILLINOIS.

FAUCET.

1,082,988.

Specification of Letters Patent.

Patented Dec. 30, 1913.

Application filed January 29, 1912. Serial No. 674,045.

*To all whom it may concern:*

Be it known that I, FRANKLYN J. WOLFF, a citizen of the United States, residing in Minneapolis, in the county of Hennepin and State of Minnesota, have invented a new and useful Improvement in Faucets, of which the following is a specification.

This invention relates to improvements in faucets.
The object of the invention is to provide a structure in which the faucet shall be provided, in addition to the customary cock for regulating the flow of water, with an auxiliary or secondary automatically self closing shut-off valve to prevent the escape and splashing of water whenever the main valve structure is removed for repairs.

My invention furthermore consists in the improvements in the parts and devices and in the combinations of the parts and devices herein shown, described or claimed.

In the drawing forming a part of this specification, Figure 1 is a vertical section of a faucet showing my improvements applied thereto. Fig. 2 is a horizontal section, taken on the line 2—2 of Fig. 1, looking in the direction of the arrows. Fig. 3 is a horizontal section, taken on the line 3—3 of Fig. 1, and looking in the direction of the arrows and Fig. 4 is an elevation of the core forming a part of the self closing main cock.

In the drawing, 10 denotes the main member of the faucet or casing, the same being provided with a spout 11 integrally formed therewith and having also a shank 12 exteriorly threaded in the ordinary manner and adapted to receive the coupling nut 13 for securing the ends of the supply pipe 14 thereto, and having also a lock nut 15. The casing 10 is provided with interior threads 16 adapted to receive the core 17, the latter containing the various parts of the main cock. The core 17 at its lower end has threaded therein a bushing 18, the same being provided with a valve seat 19, upon which is adapted to be seated the main valve 20. The bushing 18 furthermore retains in place an elastic packing ring 21, the latter forming also preferably a part of the valve seat for the valve 20. In the upper portion of the core 17 is provided a stuffing box formed by means of a packing 22 and bushing 23, the latter being threaded to the interior of the core 17 and forming also a cap for the spring 24, which surrounds the stem 25 of the valve 20. Screwed to the reduced upper end 26 of the stem is a second spring cap 27. The core 17 is provided with an upper annular flange 28 which is adapted to retain in place an elastic packing ring 29, said flange 28 being preferably milled so that the same may be easily removed. Another packing ring 30 is secured between the flange 28 and the nut 31, the latter being threaded to the casing 10 and serving to retain all the parts of the main valve in place. Secured to the interior of the nut 31 at the upper end thereof is a hollow sleeve 32, the same being provided with cam faces 33, with which coöperate cam faces 34 on the lower end of the operating member 35 which engages the rounded upper reduced end 26 of the stem 25, the member 35 being rotatable by means of the handle 36. An additional packing 37 is secured in place between the sleeve 32 and a nut 38 threaded to the nut 31. The shank 12 of the cock is provided with an interior shoulder 39, and above the shoulder 39 is also provided with an interior thread 40 in which is screwed a hollow bushing 41, the latter being provided with a valve seat 42 with which coöperates the secondary or auxiliary valve 43. The valve 43 is provided with a feathered stem 44 and is of such length that when engaged by the main valve 20, the secondary valve 43 will be held in an inoperative position, thus allowing the water to pass through the sleeve 41 and to be controlled by the main valve 20. The internal shoulder 39 prevents the valve 43 from dropping down the shank. The bushing 41 is provided with an upper external rim 45, and retains in place an elastic packing 46, and between the rim 45 and the lower end of the core 17 is also an additional packing ring 47. When the main valve is removed, it will be apparent that the water pressure in the pipe will automatically force the valve 43 against its seat 42 and retain it in such position, and thus prevent any waste or discharge of water while the main valve and coöperating parts are being repaired.

I claim:—

In combination, a casing having a spout and provided with a shank, a valve seat located within said shank, said shank being provided with an internal shoulder, a valve located within the shank between said valve seat and shoulder, said valve having a stem thereon, a second valve seat located within the casing, a removable valve coöperating therewith and opening against the fluid pressure, said last named valve normally being adapted to engage said stem and thereby holding the first named valve in its open position, and means for operating the second named valve, the first named valve being adapted to be closed automatically by the water pressure when the second named valve is removed.

FRANKLYN J. WOLFF.

Witnesses:
 WALTER R. HOEFFLIN,
 A. M. SCHNEIDER.